(12) United States Patent
An

(10) Patent No.: US 7,139,578 B2
(45) Date of Patent: Nov. 21, 2006

(54) METHOD FOR MANAGING WIRELESS ASSETS IN A COVERAGE AREA

(75) Inventor: Yongho An, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 378 days.

(21) Appl. No.: 10/104,293

(22) Filed: Mar. 22, 2002

(65) Prior Publication Data

US 2004/0203832 A1    Oct. 14, 2004

(51) Int. Cl.
*H04Q 7/20* (2006.01)
*H04Q 7/00* (2006.01)

(52) U.S. Cl. ............... 455/453; 455/436; 455/437; 455/438; 455/442; 455/443; 455/444; 370/331; 370/332; 370/328

(58) Field of Classification Search ........... 455/453, 455/436, 450, 454, 443, 442, 444, 437, 438, 455/422.1; 370/331, 332, 328
See application file for complete search history.

(56) References Cited

U.S. PATENT DOCUMENTS

| | | | | |
|---|---|---|---|---|
| 4,435,840 A | * | 3/1984 | Kojima et al. | 455/524 |
| 4,670,899 A | * | 6/1987 | Brody et al. | 455/453 |
| 5,241,685 A | * | 8/1993 | Bodin et al. | 455/453 |
| 5,280,630 A | * | 1/1994 | Wang | 455/452.2 |
| 5,749,055 A | * | 5/1998 | Dahlin | 455/453 |
| 6,128,500 A | * | 10/2000 | Raghavan et al. | 455/453 |
| 6,160,798 A | * | 12/2000 | Reed et al. | 370/331 |
| 6,278,882 B1 | * | 8/2001 | Choi | 455/453 |
| 6,347,224 B1 | * | 2/2002 | Smyth et al. | 455/406 |
| 6,385,454 B1 | * | 5/2002 | Bahl et al. | 455/450 |
| 6,567,665 B1 | * | 5/2003 | Kissee | 455/436 |
| 6,628,933 B1 | * | 9/2003 | Humes | 455/404.1 |
| 6,650,900 B1 | * | 11/2003 | Chavez et al. | 455/446 |
| 6,782,263 B1 | * | 8/2004 | Peltola et al. | 455/452.1 |
| 6,788,943 B1 | * | 9/2004 | Hamalainen et al. | 455/450 |
| 6,792,273 B1 | * | 9/2004 | Tellinger et al. | 455/442 |
| 2001/0004596 A1 | * | 6/2001 | Steijer et al. | 455/436 |
| 2002/0042276 A1 | * | 4/2002 | Hakalin et al. | 455/453 |
| 2002/0107026 A1 | * | 8/2002 | Agrawal et al. | 455/453 |
| 2002/0119779 A1 | * | 8/2002 | Ishikawa et al. | 455/437 |
| 2003/0114159 A1 | * | 6/2003 | Park et al. | 455/436 |
| 2003/0148765 A1 | * | 8/2003 | Ma et al. | 455/438 |

* cited by examiner

*Primary Examiner*—George Eng
*Assistant Examiner*—Huy Phan

(57) ABSTRACT

A method for managing wireless assets in a first coverage area based upon call activity in at least one second coverage area substantially adjacent with the first coverage area includes the steps of: (a) in no particular order: (1) selecting a parameter relating to the call activity; and (2) selecting at least one threshold value for the parameter relating to imminence of increased call activity in the first coverage area; (b) measuring the parameter in at least one region in the at least one second coverage area; and (c) when the parameter substantially meets the at least one threshold value, reserving a measure of call-handling capacity from call activity in the first coverage area for use in said at least one second coverage area.

17 Claims, 4 Drawing Sheets

US 7,139,578 B2

METHOD FOR MANAGING WIRELESS ASSETS IN A COVERAGE AREA

BACKGROUND OF THE INVENTION

The present invention is directed to a method for managing wireless assets in a coverage area, and especially to managing wireless assets in a first coverage area based upon call activity in at least one second coverage area substantially adjacent with the first coverage area.

Wireless network technology is a key technology for providing mobile computing and communication capabilities. A fast growing population of users seeks a variety of mobile services, such as voice, voice over Internet Protocol (VoIP), videophone and other services. Such a growing and widespread demand for such a variety of services has made radio resource management of wireless networks a key design issue in constructing wireless networks.

Wireless communication networks, including cellular telephone networks and third generation wireless networks (e.g., Universal Mobile Telecommunications System (UMTS) and CDMA2000) require efficient wireless asset, or radio resource, management techniques for effectively employing limited bandwidth resources in high traffic environments. The management of radio resources is especially intricate and difficult in systems where users may be handed off among neighboring network controllers as they travel among various coverage areas.

Under normal traffic conditions the allocated radio resources of a network coverage area or cell can accommodate all of the demands of mobile users operating in the cell. However, during peak load periods, and especially in bursty traffic conditions, the radio resources of a cell may not be sufficient to meet all service demands that are made. Such an occurrence of a bursty demand increase is sometimes referred to as a "hot spot". Hot spots can cause unacceptable degradation of network performance as may be manifested for example in dropped calls, fast busy signals indicating the network is busy, or similar shortcomings in communication services. Resource borrowing is one technique that may be employed to maintain acceptable service levels in hot spots or during other high traffic periods. Resource borrowing provides that wireless assets or resources, such as bandwidth, frequency or another measure of communication capacity or call handling capacity, is borrowed from a neighboring cell or call coverage area (lending call coverage area), usually an adjacent cell or call coverage area. A cell or call coverage area (borrowing call coverage area) that experiences service demands in excess of its capacity can send a borrowing request to a neighboring cell. The lending cell can permit use of certain of its capacity by the borrowing cell and in such manner the borrowing cell can gather sufficient additional resources to satisfy the increased service demand at the hot spot or other high traffic demand area.

Previous resource borrowing techniques or methods have failed to address timeliness of resource borrowing and the result has often been there is unnecessary or wasteful borrowing. Wasteful borrowing places an unnecessary burden upon lending cells. A new demand may arise in a cell, for example, when a user places a new call in the cell or when a user enters the cell from an adjacent cell in a hand off operation. When a new demand arises in a cell, once it is determined that additional resource is required to meet the new demand a resource borrowing demand process is initiated. Time is spent in such activities as contacting one or more neighboring cell as a potential lending cell, checking resources available for lending by the neighboring cells, selecting particular base stations in the neighboring cells that can lend resources, and transferring resources that are identified as available for lending from their resident base station to the base station of the borrowing cell. Often this rather lengthy multi-step process takes too long for an individual caller who made the additional service demand requiring borrowed resources and the caller hangs up, or the borrowing cell times out and drops the call. The time out aspect of service interruption is particularly likely to occur in third generation wireless networks during handoff operations because of particular real time limits imposed in those networks' operations.

There is a need for an improved method for managing wireless assets in a first coverage area or cell based upon call activity in at least one second coverage area or cell that can more efficiently effect resource borrowing to support operations in the at least one second coverage area.

SUMMARY OF THE INVENTION

A method for managing wireless assets in a first coverage area based upon call activity in at least one second coverage area substantially adjacent with the first coverage area includes the steps of: (a) in no particular order: (1) selecting a parameter relating to the call activity; and (2) selecting at least one threshold value for the parameter relating to imminence of increased call activity in the first coverage area; (b) measuring the parameter in at least one region in the at least one second coverage area; and (c) when the parameter substantially meets the at least one threshold value, reserving a measure of call-handling capacity from call activity in the first coverage area for use in said at least one second coverage area.

It is therefore an object of the present invention to provide a method for managing wireless assets in a first coverage area based upon call activity in at least one second coverage area that can more efficiently effect resource borrowing to support operations in the at least one second coverage area.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

In FIG. 1, a second call coverage area 10 has a boundaiy 11 and is surrounded by first call coverage areas 12, 14, 16. A border 20 separates first call coverage areas 12, 16. A border 22 separates first call coverage areas 12, 14. A border 24 separates first call coverage areas 14, 16. Borders 20, 22, 24 are not hard borders per se. Rather, borders 20, 22, 24 are separations between adjacent first call coverage areas 12, 14, 16 that indicate limits of call coverage responsibilities among base stations (not shown in FIG. 1) servicing first call coverage areas 12, 14, 16. That is, borders 20, 22, 24 are determined by wireless call network designers using, for example, antenna directivity, power levels and other design criteria to delineate first call coverage areas 20, 22, 24. Borders 20, 22, 24 intersect boundary 11 at intersections 21, 23, 25.

DETAILED DESCRIPTION OF THE PREFERRED EMBODIMENT

The method of the present invention provides for reserving wireless assets in advance of their actually being required to support operations. That is, a pool of wireless assets or resources, such as wireless bandwidth or frequency, is identified as likely to be needed soon and at least a portion of the pool of resources is set aside or reserved in a first call coverage area for future use in at least one second call coverage area. A preferred method for effecting the required identification for impending need of additional resources in the at least one second call coverage area is to measure the population of users in the at least one second call coverage area. An alternate method for effecting the required identification of impending need of additional resources in the at least one second call coverage area is to measure the present population of users in the at least one second call coverage area adjusted by expected additions and subtractions of users from that existing population. Such anticipatory determination of need for additional wireless resources and reserving resources in advance of their need can significantly contribute to meeting timely demands for resources in real time, reduce waiting time for resources and reduce service interruptions such as dropped calls and fast busy signals indicating a network busy condition.

Figure 1:
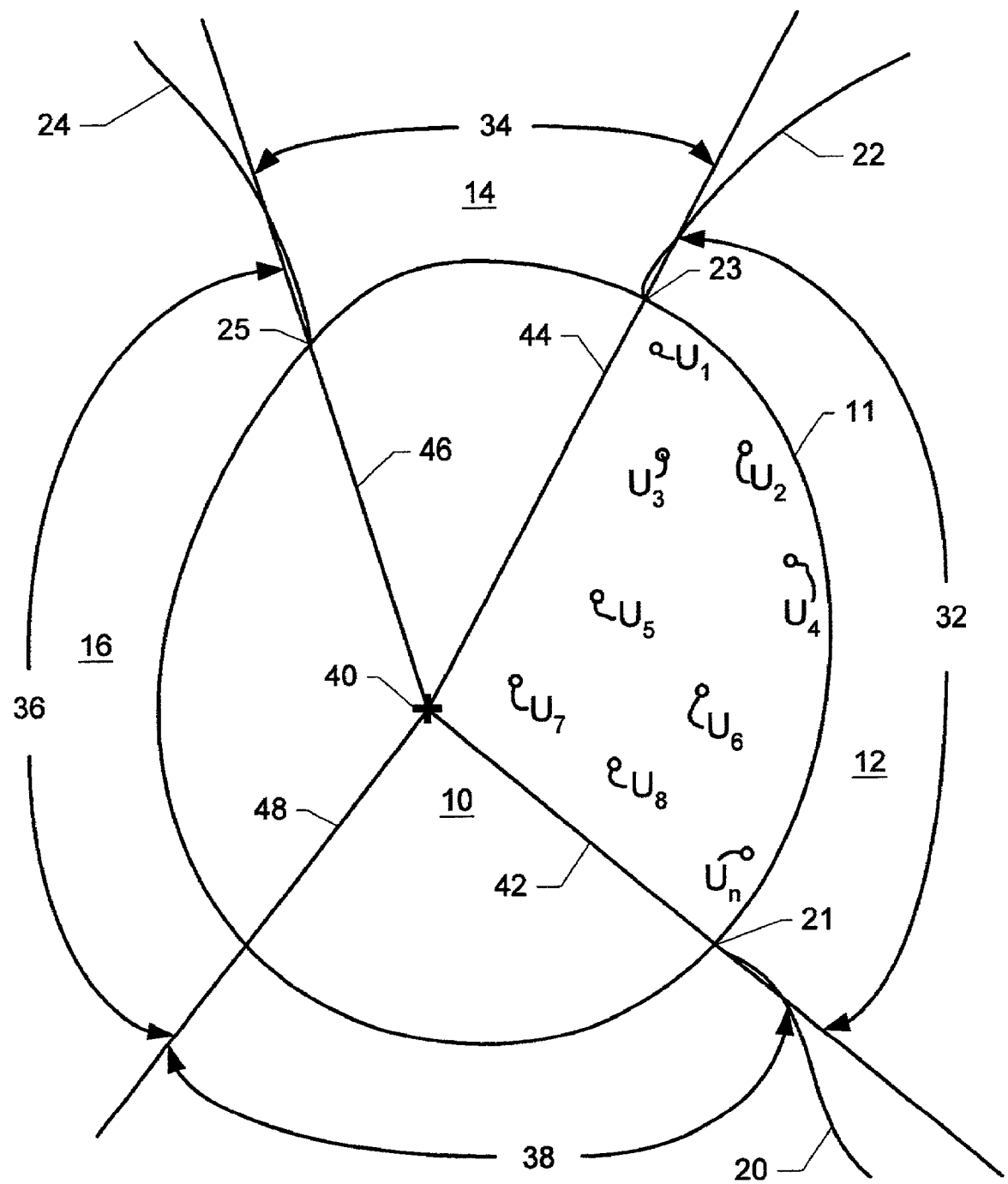
FIG. 1 is a schematic diagram illustrating management of resource borrowing among call coverage areas as practiced according to the present invention.

FIG. 1 is a schematic diagram illustrating management of resource borrowing among call coverage areas as practiced according to the present invention. In FIG. 1, a second call coverage area 10 has a boundary 11 and is surrounded by first call coverage areas 12, 14, 16. A border 20 separates first call coverage areas 12, 16. A border 22 separates first call coverage areas 12, 14. A border 24 separates first call coverage areas 14, 16. Orders 20, 22, 24 are not hard borders per se. Rather, borders 20, 22, 24 are separations between adjacent first call coverage areas 12, 14, 16 that indicate limits of call coverage responsibilities among base stations (not shown in FIG. 1) servicing first call coverage areas 12, 14, 16. That is, borders 20, 22, 24 are determined by wireless call network designers using, for example, antenna directivity, power levels and other design criteria to delineate first call coverage areas 20, 22, 24. Borders 20, 22, 24 intersect boundary 11 at intersections 21, 23, 25.

For purposes of practicing advance resource reservation activities pursuant to the present invention, second call coverage area 10 establishes sectors 32, 34, 36, 38 that are substantially determined by radii 42, 44, 46 from base station 40 to intersections 21, 23, 25 of borders 20, 22, 24 with boundary 11 of second call coverage area 10. Thus radius 42 is established from base station 40 through intersection 21. Radius 44 is established from base station 40 through intersection 23. Radius 44 is established from base station 46 through intersection 25. An additional radius 48 is illustrated in FIG. 1. Radius 48 is optional and may be included to limit the scope of the sector delineating the common border shared between second call coverage area 10 and first call coverage area 16. For purposes of the present invention, radius 48 may be eliminated and only one sector may be established between radii 42, 46.

Operation of the present invention will be representatively described in connection with the relationship between second call coverage area 10 and first call coverage area 12. The teachings described herein may be simultaneously applied to affect cooperation between second call coverage area 10 and other first call coverage areas 14, 16.

The parameter identified for measuring in practicing the method of the present invention in the exemplary situation illustrated in FIG. 1 is number of operators operating within a given sector of second operating area 10. In FIG. 1, a plurality of users $U_1, U_2, U_3, U_4, U_5, U_6, U_7, U_8, \ldots U_n$ are operating in sector within boundary 11 of second call coverage area 10. Once the number of users $U_n$ operating in sector 32 of second call coverage area 10 (the borrowing second call coverage area) meets a given threshold (the threshold is preferably decided beforehand) a base station control (not shown in FIG. 1) in first call coverage area 12 (the loaning first call coverage area) is alerted to the fact and first call coverage area 12 can predesignate a predetermined quantum of wireless assets for use by second call coverage area 10 in sector 32. It is preferable that first call coverage area 12 consider its own traffic load in deciding whether to set aside reserved wireless assets or how many wireless assets are set aside per quantum. The point is that, setting aside, or reserving, a quantum of wireless assets before they are needed, in anticipation of their being needed, saves a significant amount of processing time in allocating those borrowed assets by the borrowing second call coverage area (second call coverage area 10) when additional users $U_n$ begin operating in the borrowing second call coverage area.

Other considerations may be imposed in ascertaining the duration of the reservations. For example, there may be a time out provision by which the reserved wireless assets are returned to the loaning first call coverage area after a predetermined time. Alternatively, or additionally, return of borrowed assets to a loaning first call coverage area may be required whenever the traffic load of the loaning first call coverage area approaches a given load factor vis-à-vis the capacity of the loaning first call coverage area.

The limits of sector 32 and boundary 11 of second call coverage area 10 may be determined by the known bearings of radii 42, 44, the known (x,y) coordinate position of base station 40 and the distance of each respective user $U_n$. Knowing those three parameters allows determination of whether a given user $U_n$ is to be counted for purposes of reserving assets in anticipation of increased asset requirements by second call coverage area 10 vis-à-vis first call coverage area 12. The (x,y) coordinate position of base station 40 is known and does not change. The bearings of radii 42, 44 are known and do not change. The distance to a particular user $U_n$ from base station 40 may be determined using time difference of arrival (TDOA) techniques.

Figure 2:
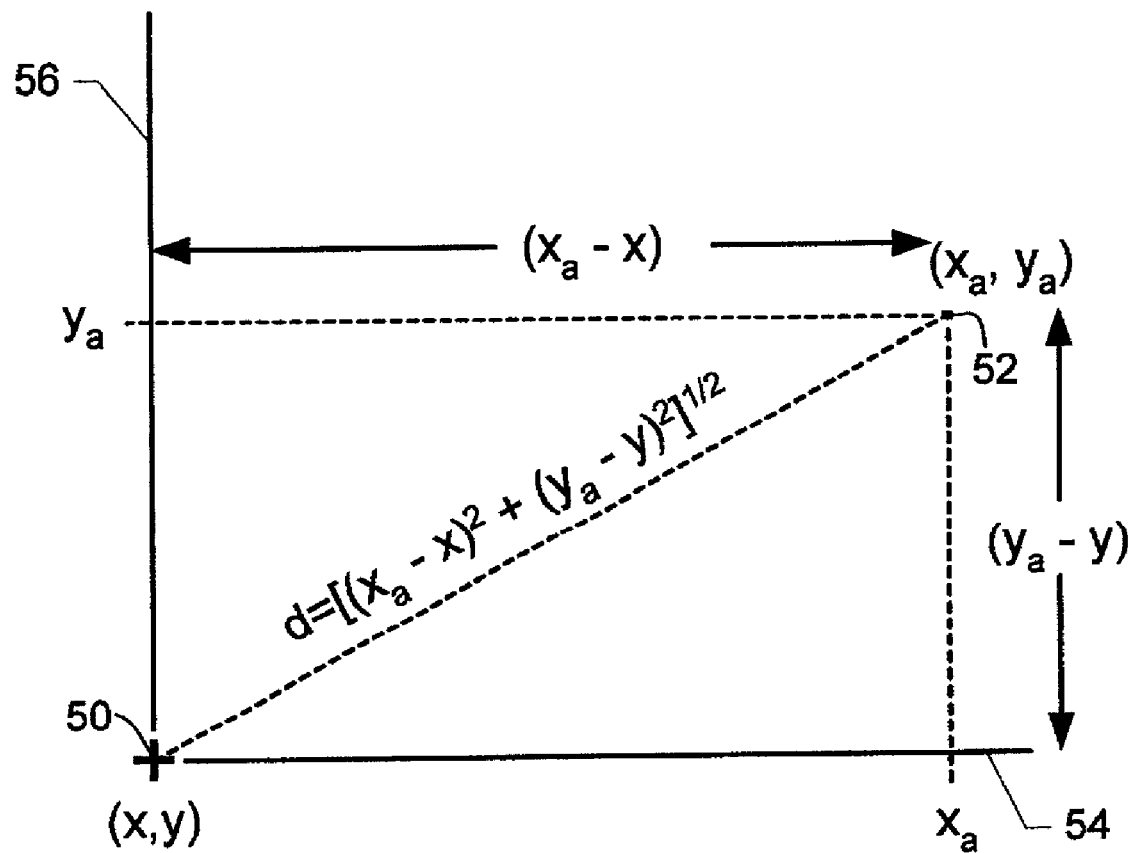
FIG. 2 is a schematic diagram illustrating calculations associated with the time difference of arrival calculations for determining distance in wireless communication systems.

FIG. 2 is a schematic diagram illustrating calculations associated with the time difference of arrival calculations for determining distance in wireless communication systems. The time difference of arrival (TDOA) method for determining distance of a user from a base station involves using the intersection of hyperbolic lines of position established by times of arrival of a signal from two or more base stations. The range difference between two base stations (usually in adjacent call coverage areas) is determined by measuring time difference of arrival of a signal.

In FIG. 2, an origin 50 has coordinates (x,y) and a sample point 52 has coordinates $(x_a, y_a)$ as measured on x-axis 54 and y-axis 56. Thus, the distance in the x-direction along x-axis 54 between origin 50 and sample point 52 is $(x_a-x)$. The distance in the y-direction along y-axis 56 between origin 50 and sample point 52 is $(y_a-y)$. Applying the Pythagorean theorem yields the distance d directly from origin 50 to sample point 52 as:

$$d=[(x_a-x)^2+(y_a-y)^2]^{1/2} \quad [1]$$

The time difference of arrival TDOA of signals from two base stations i and j define a mobile user's location in a region:

$$RD_{i,j}=C(TDOA_{i,j})=R_i-R_j \quad [2]$$

where C=speed of propagation of radio waves;
$TDOA_{i,j}$=TDOA between two base stations i and j;
$R_i$=range between base station i and the user;
$R_j$=range between base station j and the user;
$RD_{i,j}$=range difference between base station i and base station j.

Thus, the range difference between base station i and base station j is:

$$RD_{i,j}=[(x_i-x)^2+(y_i-y)^2]^{1/2}-[(x_j-x)^2+(y_j-y)^2]^{1/2} \quad [3]$$

Applying the TDOA calculation, the location of an individual user can be determined. Having such location information permits a base station or other call coverage area controller to make the requisite determination regarding population of users within a sector with sufficient accuracy to effect the method of the present invention to anticipatorily reserve wireless assets from a neighboring call coverage area ahead of the time the resources are actually required.

Alternatively, the population of users in a sector is determined using TDOA techniques, as described above, and the threshold figure that initiates a reservation of assets from a neighboring call coverage area may be the rate of growth of user population in a sector. In such an arrangement, when a base station or other network control entity observes a sufficiently high rate of growth of user population, a neighboring call coverage area may be tapped for reserving wireless assets for use by the borrowing call coverage having the growing user population.

The manner of carrying out the reservation of wireless resources may vary. One exemplary approach is to establish a Normal Free Resources Pool (NFRP) that holds all normal resources for a call coverage area. When a new request for a reservation of resources arrives, so long as the NFRP is not empty appropriate resources are assigned to fill the request. Another example of an arrangement for effecting reservation of resources is to establish a Borrow Resource Pool (BRP) that holds some portion of resources of a neighboring call coverage area for future use. Resources in a BRP usually cannot be donated to other call coverage areas. This limitation is often used to avoid co-channel interference situations. Yet another exemplary approach is to establish a Reservation Resource Pool (RRP) that holds a portion of the NFRP that is free but not yet used or held back. Preferably a margin of resources is held back from inclusion in the RRP and maintained as not available for borrowing to ensure continuity of operation of the lending call coverage area. Other arrangements may also be established to govern the manner in which resources may be loaned.

Arrangements governing reservation of resources for loaning are typically effected in a dynamic fashion. That is, a greater number of resources may be reserved for loaning when a threshold is exceeded by a greater amount and a lesser number of resources may be reserved for loaning when a threshold is only just met.

This approach may be employed when one uses the Advanced Forward Link Trilateralization (AFLT) or the Enhanced Forward Link Trilateralization (EFLT) geographical location system. AFLT is a TDOA based location system used with Code Division Multiple Access (CDMA) wireless phone systems. EFLT is a TDOA based location system used for Global System for Mobile Communications (GSM) wireless phone systems. AFLT and EFLT measure such parameters as numbers of activated or non-activated users in a system. The number of non-activated mobile users in a call coverage area is designated by the parameter p. More resources may be set aside as the parameter p increases. As the parameter p decreases, more resources may be returned to the NFRP of a neighboring call coverage area.

It is preferable that a borrowing call coverage area involve the parameter p, the number of existing activated users, and the availability of own resources in considering whether and when to seek to borrow resources from a neighboring call coverage area. As mentioned earlier, other considerations may also be taken into account, such as the rate of growth of the population of activated users in the borrowing call coverage area. Still further, one may take into account impending decreases in user population, such as users approaching the lending call coverage area from the borrowing call coverage area. If those users are likely to be handed off to the lending call coverage area, there is less impetus for reserving further resources for lending by the lending call coverage area. Indeed, in such circumstances there is more likely a greater impetus for keeping or returning resources to the lending call coverage area to accommodate the anticipated increase in activated users in the lending call coverage area.

Figure 3:
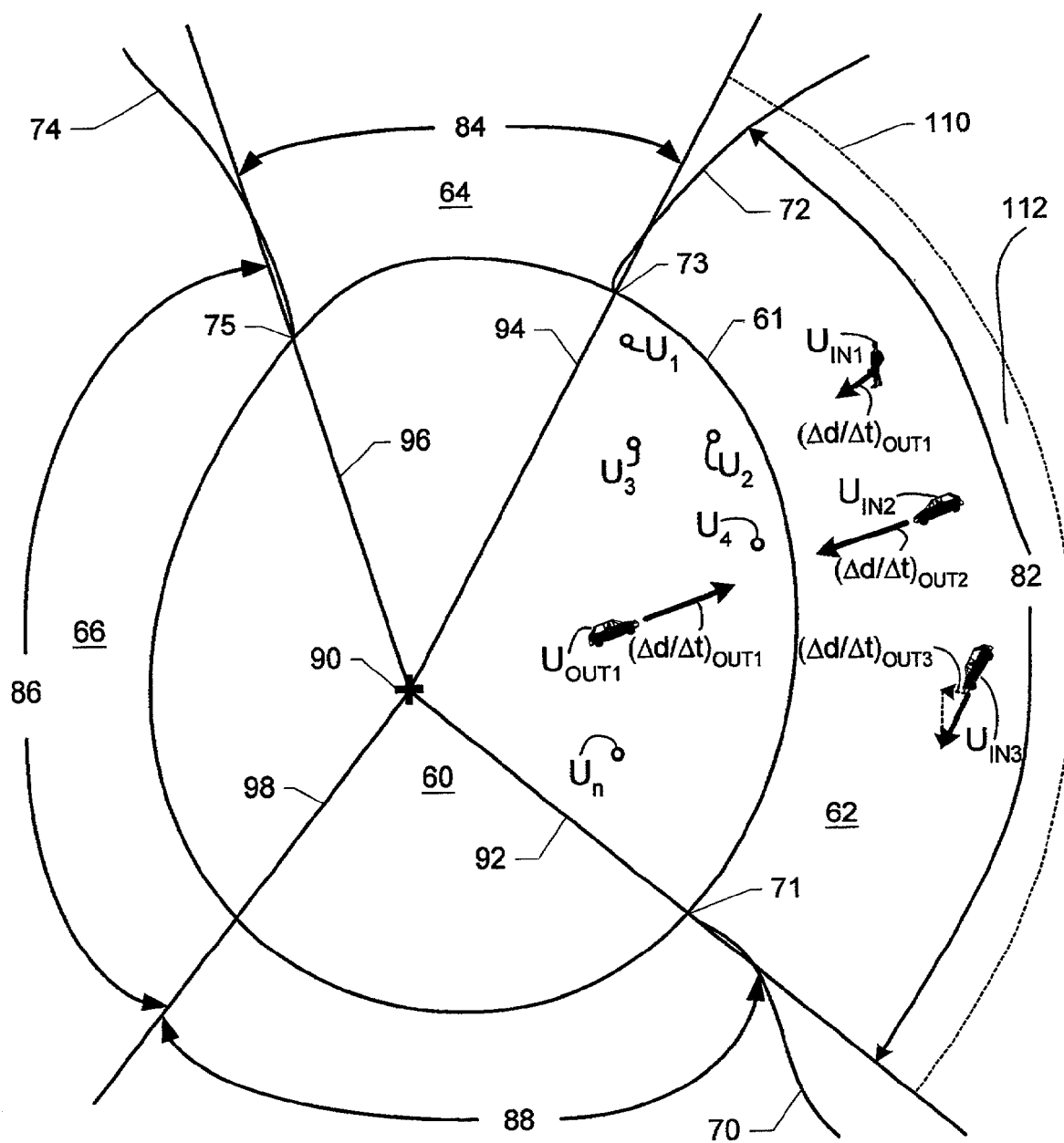
FIG. 3 is a schematic diagram illustrating an alternate methodology for management of resource borrowing among call coverage areas as practiced according to the present invention.

FIG. 3 is a schematic diagram illustrating an alternate methodology for management of resource borrowing among call coverage areas as practiced according to the present invention. In FIG. 3, a second call coverage area 60 has a boundary 61 and is surrounded by first call coverage areas 62, 64, 66. A border 70 separates first call coverage areas 62, 66. A border 72 separates first call coverage areas 62, 64. A border 74 separates first call coverage areas 64, 66. Borders 70, 72, 74 are not hard borders per se. Rather, borders 70, 72, 74 are separations between adjacent first call coverage areas 62, 64, 66 that indicate limits of call coverage responsibilities among base stations (not shown in FIG. 3) servicing first call coverage areas 62, 64, 66. That is, borders 70, 72, 74 are determined by wireless call network designers using, for example, antenna directivity, power levels and other design criteria to delineate first call coverage areas 70, 72, 74. Borders 70, 72, 74 intersect boundary 61 at intersections 71, 73, 75.

Sectors 82, 84, 86, 88 are determined by radii 92, 94, 96 from base station 90 to intersections 71, 73, 75 of borders 70, 72, 74 with boundary 61 of second call coverage area 60. Thus radius 92 is established from base station 90 through intersection 71. Radius 94 is established from base station 90 through intersection 73. Radius 94 is established from base station 90 through intersection 75. An additional radius 98 is illustrated in FIG. 3. Radius 98 is optional and may be included to limit the scope of the sector delineating the common border shared between second call coverage area 60 and first call coverage area 66. For purposes of the present invention, radius 98 may be eliminated and only one sector may be established between radii 92, 96.

Operation of the alternate embodiment of the present invention will be representatively described in connection with the relationship between second call coverage area 60 and first call coverage area 62. The teachings described herein may be simultaneously applied to affect cooperation between second call coverage area 60 and other first call coverage areas 64, 66.

One parameter identified for measuring in practicing the method of the alternate embodiment of the present invention in the exemplary situation illustrated in FIG. 3 is number of operators operating within a given sector of second operating area 60. As was the case in second call coverage area 10 (FIG. 1), second call coverage area 60 (FIG. 3) has a plurality of users $U_1, U_2, U_3, U_4, \ldots U_n$ operating in sector 82 within boundary 61 of second call coverage area 60. Once the number of users $U_n$ operating in sector 82 of second call coverage area 60 (the borrowing second call coverage area) meets a given threshold (the threshold is preferably decided beforehand) a base station control (not shown in FIG. 3) in first call coverage area 62 (the loaning first call coverage area) is alerted to the fact.

Another parameter is considered in the alternate embodiment of the present invention illustrated in FIG.3: account is taken of imminent arrivals of user into second call coverage area 60 and imminent departures of users from second call coverage area 60. This is effected by using a plurality of Time Difference of Arrival (TDOA) determinations of positions of users within call coverage areas 60, 62. In the embodiment of the invention illustrated in FIG. 3, only certain of the users in first call coverage area 62 are considered in this imminent arrival—imminent departure determination. Specifically, a range boundary 110 is established defining a contiguous zone 112 of first call coverage area 62 that abuts second call coverage area 60. The time variance of position $$\frac{\Delta d}{\Delta t}$$

(i.e., speed) of users within contiguous zone 112 is determined, and when the time variance of position $$\frac{\Delta d}{\Delta t}$$

toward second call coverage area 60 of a user within contiguous zone 112 exceeds a predetermined threshold the user is considered an imminently arriving user to second call coverage area 60. Similarly, users in second call coverage area 60 that have a certain time variance of position $$\frac{\Delta d}{\Delta t}$$

toward first call coverage area 62 are considered as imminently departing users from second call coverage area 60. Vector calculations may be employed to determine the component of time variance of position $$\frac{\Delta d}{\Delta t}$$

toward a respective call coverage area 60, 62.

Thus, referring to FIG. 3, a walking user $U_{IN1}$ in zone 112 is proceeding directly toward second call coverage area 60, but at a relatively low time variance of position $$\frac{\Delta d}{\Delta t}$$

(i.e., speed). Walking user $U_{IN1}$ is moving toward second call coverage area 60 at a speed $$\left(\frac{\Delta d}{\Delta t}\right)_{IN1}.$$

An automobile user $U_{IN3}$ is traveling at a higher speed than walking user $U_{IN1}$ but in a more tangential direction with respect to second call coverage area 60 than is the direction of travel of walking user $U_{IN1}$. The tangential direction of travel means that the vector component of speed $$\frac{\Delta d}{\Delta t}$$

toward second call coverage area 60 is low for user $U_{IN3}$. Automobile user $U_{IN3}$ is moving toward second call coverage area 60 at a speed $$\left(\frac{\Delta d}{\Delta t}\right)_{IN3}.$$

Another automobile user $U_{IN2}$ is traveling at a higher speed than walking user $U_{IN1}$ and in a direction substantially directly toward second call coverage area 60. The direct direction of travel means that the vector component of speed $$\frac{\Delta d}{\Delta t}$$

toward second call coverage area 60 is highest for user $U_{IN2}$ among inbound users $U_{IN1}, U_{IN2}, U_{IN3}$. Automobile user $U_{IN2}$ is moving toward second call coverage area 60 at a speed $$\left(\frac{\Delta d}{\Delta t}\right)_{IN2}.$$

A driving user $U_{OUT1}$ in second call coverage area 60 is proceeding in a direction substantially radially outward from base station 90 at a speed ( $$\frac{\Delta d}{\Delta t}$$

)$_{OUT1}$, and can therefore be regarded as being outbound from second call coverage area 60 toward first call coverage area 62. The alternate embodiment of the method of the present invention illustrated in FIG. 3 contemplates accounting for users $U_1, U_2, U_3, U_4, \ldots U_n$ in second call coverage area 60, accounting for inbound users $U_{IN1}, U_{IN2}, U_{IN3}$ to second call coverage area 60 and accounting for outbound user $U_{OUT1}$ from second call coverage area 60 in ascertaining attainment of threshold levels when deciding issues relating to anticipatory reservation of wireless assets from first call coverage area 62 for use by second call coverage area 60.

It is preferable that first call coverage area 62 consider its own traffic load, including imminent inbound users to first call coverage area 62, in deciding whether to set aside reserved wireless assets or how many wireless assets are set aside per quantum. The point is that, setting aside, or reserving, a quantum of wireless assets before they are needed, in anticipation of their being needed, saves a significant amount of processing time in allocating those borrowed assets by the borrowing second call coverage area (second call coverage area 60) when additional users $U_n$ begin operating in the borrowing second call coverage area 60.

Other considerations may be imposed in ascertaining the duration of the reservations. For example, there may be a time out provision by which the reserved wireless assets are returned to loaning first call coverage area 62 after a predetermined time. Alternatively, or additionally, return of borrowed assets to lending first call coverage area 62 may be required whenever the traffic load of lending first call coverage area 62 approaches a given load factor vis-à-vis the capacity of lending first call coverage area 62.

Figure 4:
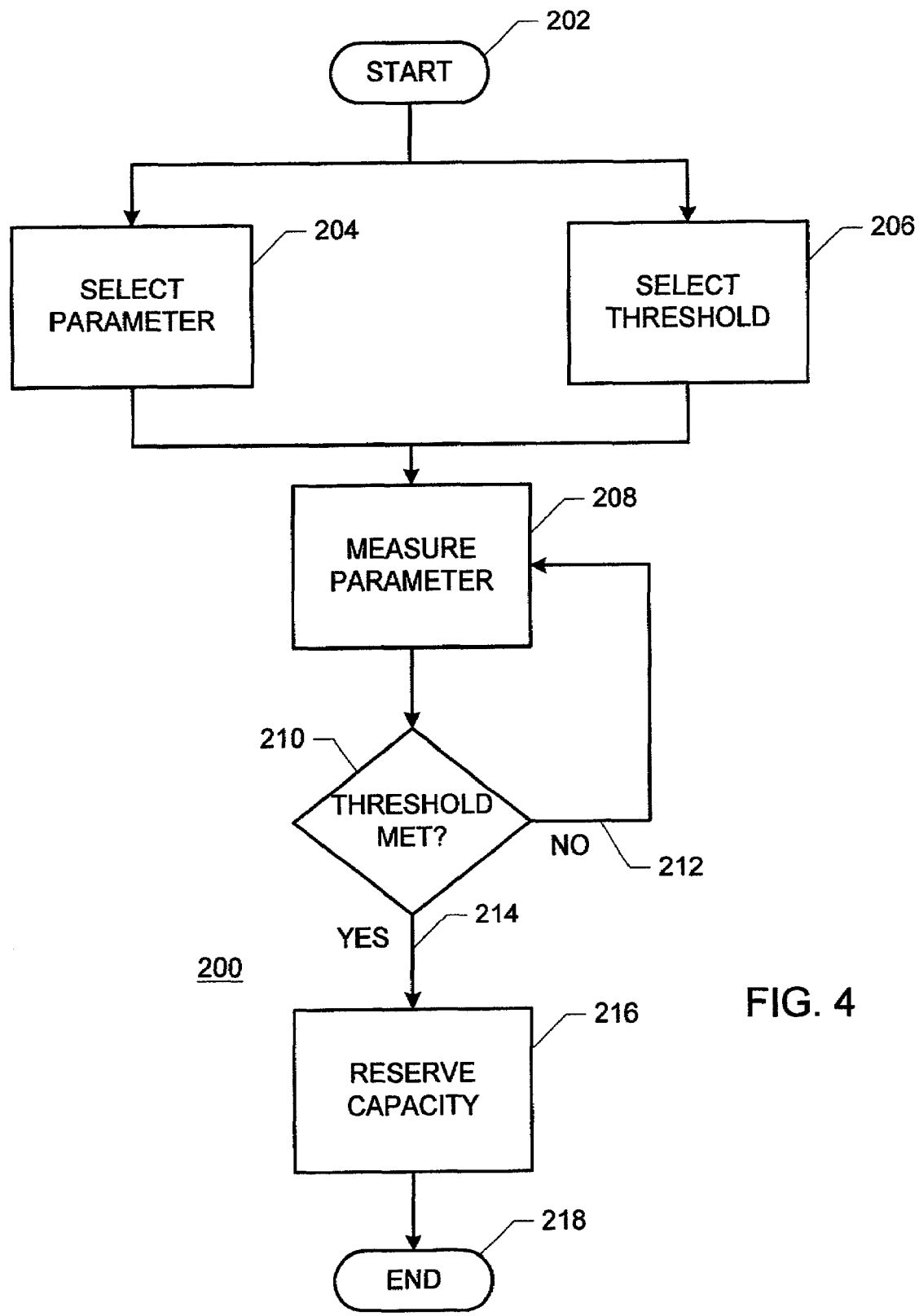
FIG. 4 is a flow diagram illustrating the method of the present invention.

FIG. 4 is a flow diagram illustrating the method of the present invention. In FIG. 4, a method 200 for managing wireless assets in a first coverage area based upon call activity in at least one substantially adjacent second coverage area begins at a START locus 202. Method 200 continues to, in no particular order, select a parameter relating to the call activity, as indicated by a block 204, and select at least one threshold value for the parameter, as indicated by a block 206. The at least one threshold value relates to imminence of increased call activity in the first coverage area.

Method 200 continues by measuring the parameter in at least one region in the at least one second coverage area, as indicated by a block 208. Method 200 continues by posing a query whether the parameter substantially meets the at least one threshold value, as indicated by a query block 210. If the parameter does not substantially meet the at least one threshold value, method 200 continues via NO response line 212 and the parameter is measured again, as indicated by block 208. If the parameter does substantially meet the at least one threshold value, method 200 continues via YES response line 214 and a measure of call-handling capacity is reserved from call activity in the first coverage area for use in the at least one second coverage area, as indicated by a block 216. Method 200 then terminates, as indicated by END locus 218.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

What is claimed is:

1. A method for managing wireless assets in a first coverage area based upon call activity in at least one second coverage area substantially adjacent with said first coverage area; the method comprising the steps of:

(a) in no particular order:

(1) selecting a parameter relating to said call activity, wherein said parameter is a net number of mobile calls imminently arriving in said second coverage area from said first coverage area derived by determining rate of change of user population in said second coverage area compared to rate of change of user population in said first coverage area; and (2) selecting at least one threshold value for said parameter; said at least one threshold value relating to rate of change of user population in said first coverage area;

(b) measuring said parameter in at least one region in said at least one second coverage area; and when said parameter substantially meets said at least one threshold value, reserving a measure of call-handling capacity from call activity in said first coverage area for use in said at least one second coverage area.

2. The method for managing wireless assets in a first coverage area based upon call activity in at least one second coverage area substantially adjacent with said first coverage area as recited in claim 1 wherein said parameter is related to numbers of calls placed from said at least one region weighted by respective ranges of individual said calls.

3. The method for managing wireless assets in a first coverage area based upon call activity in at least one second coverage area substantially adjacent with said first coverage area as recited in claim 2 wherein said at least one threshold value is a plurality of successively higher threshold values, and wherein said reserving is effected in successive quantum amounts as successively higher said threshold values are met.

4. The method for managing wireless assets in a first coverage area based upon call activity in at least one second coverage area substantially adjacent with said first coverage area as recited in claim 1 wherein said parameter is related to numbers of calls placed from said at least one region weighted by rates of changes of respective ranges of individual said calls.

5. The method for managing wireless assets in a first coverage area based upon call activity in at least one second coverage area substantially adjacent with said first coverage area as recited in claim 4 wherein said at least one threshold value is a plurality of successively higher threshold values, and wherein said reserving is effected in successive quantum amounts as successively higher said threshold values are met.

6. The method for managing wireless assets in a first coverage area based upon call activity in at least one second coverage area substantially adjacent with said first coverage area as recited in claim 1 wherein said at least one threshold value is a plurality of successively higher threshold values, and wherein said reserving is effected in successive quantum amounts as successively higher said threshold values are met.

7. The method for managing wireless assets in a first coverage area based upon call activity in at least one second coverage area substantially adjacent with said first coverage area as recited in claim 1 wherein said parameter is a net number of mobile calls imminently arriving in said second coverage area from said first coverage area, and said net number is a number of imminent arrivals minus a number of imminent departures.

8. The method for managing wireless assets in a first coverage area based upon call activity in at least one second coverage area substantially adjacent with said first coverage area; the method comprising the steps of:

(a) in no particular order:

(1) selecting at least one first parameter relating to said call activity;
(2) selecting at least one first threshold value for said at least one first parameter; said at least one first threshold value relating to imminence of increased call activity in said first coverage area;
(3) selecting at least one second parameter relating to call-handling capacity of said first coverage area; and
(4) selecting at least one second threshold value for said at least one second parameter; said at least one second threshold value relating to a minimum acceptable call handling capacity acceptable in said first coverage area;
(b) in no particular order:
(1) measuring said at least one first parameter in at least one region in said at least one second coverage area; and
(2) measuring said at least one second parameter in said first coverage area; and
when said at least one first parameter substantially meets said at least one first threshold value, so long as said second parameter remains above said at least one second threshold value, reserving a measure of call-handling capacity from call activity in said first coverage area for use in said at least one second coverage area.

9. The method for managing wireless assets in a first coverage area based upon call activity in at least one second coverage area substantially adjacent with said first coverage area as recited in claim 8 wherein said at least one first parameter is numbers of calls placed from said at least one region.

10. A method for managing wireless assets in a first coverage area based upon call activity in at least one second coverage area substantially adjacent with said first coverage area as recited in claim 9 wherein said at least one first threshold value is a plurality of successively higher first threshold values, and wherein said reserving is effected in successive quantum amounts as successively higher said first threshold values are met.

11. A method for managing wireless assets in a first coverage area based upon call activity in at least one second coverage area substantially adjacent with said first coverage area as recited in claim 8 wherein said at least one first parameter is related to numbers of calls placed from said at least one region weighted by respective ranges of individual said calls.

12. A method for managing wireless assets in a first coverage area based upon call activity in at least one second coverage area substantially adjacent with said first coverage area as recited in claim 11 wherein said at least one first threshold value is a plurality of successively higher first threshold values, and wherein said reserving is effected in successive quantum amounts as successively higher said first threshold values are met.

13. A method for managing wireless assets in a first coverage area based upon call activity in at least one second coverage area substantially adjacent with said first coverage area as recited in claim 8 wherein said at least one first parameter is related to numbers of calls placed from said at least one region weighted by rates of changes of respective ranges of individual said calls.

14. A method for managing wireless assets in a first coverage area based upon call activity in at least one second coverage area substantially adjacent with said first coverage area as recited in claim 13 wherein said at least one first threshold value is a plurality of successively higher first threshold values, and wherein said reserving is effected in successive quantum amounts as successively higher said first threshold values are met.

15. A method for managing wireless assets in a first coverage area based upon call activity in at least one second coverage area substantially adjacent with said first coverage area as recited in claim 8 wherein said at least one first threshold value is a plurality of successively higher first threshold values, and wherein said reserving is effected in successive quantum amounts as successively higher said first threshold values are met.

16. The method for managing wireless assets in a first coverage area based upon call activity in at least one second coverage area substantially adjacent with said first coverage area as recited in claim 8 wherein said parameter is a net number of mobile calls imminently arriving in said second coverage area from said first coverage area.

17. The method for managing wireless assets in a first coverage area based upon call activity in at least one second coverage area substantially adjacent with said first coverage area as recited in claim 16 wherein said parameter is a net number of mobile calls imminently arriving in said second coverage area from said first coverage area, and said net number is a number of imminent arrivals minus a number of imminent departures.

\* \* \* \* \*